US010569866B2

(12) United States Patent
Cravener et al.

(10) Patent No.: US 10,569,866 B2
(45) Date of Patent: *Feb. 25, 2020

(54) METHOD AND APPARATUS FOR PROXIMITY CONTROL BETWEEN ROTATING AND NON-ROTATING AIRCRAFT COMPONENTS

(71) Applicant: Bell Helicopter Textron Inc., Fort Worth, TX (US)

(72) Inventors: Kyle Thomas Cravener, Watauga, TX (US); Paul Sherrill, Grapevine, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,986

(22) Filed: Jul. 2, 2018

(65) Prior Publication Data

US 2020/0001988 A1    Jan. 2, 2020

(51) Int. Cl.
  *B64C 27/06* (2006.01)
  *B64C 27/00* (2006.01)
  *B64C 27/57* (2006.01)
  *B64C 29/00* (2006.01)

(52) U.S. Cl.
  CPC ............ *B64C 27/008* (2013.01); *B64C 27/57* (2013.01); *B64C 27/06* (2013.01); *B64C 29/0033* (2013.01)

(58) Field of Classification Search
  CPC ....... B64C 27/008; B64C 27/57; B64C 27/06; B64C 29/0033; B64C 39/024; B64C 39/001; B64C 27/08; B64C 27/82; B64D 45/08; G08G 5/0078; G01S 13/87
  See application file for complete search history.

(56) References Cited

U.S. PATENT DOCUMENTS

| 5,749,540 | A  | * | 5/1998  | Arlton ...................... B64C 27/82   |
|           |    |   |         |                           244/17.13       |
| 6,322,324 | B1 | * | 11/2001 | Kennedy ............... B64C 27/001       |
|           |    |   |         |                           244/17.13       |
| 9,213,096 | B2 | * | 12/2015 | Kreitmair-Steck ..... G01S 13/87          |
| 9,767,423 | B2 | * | 9/2017  | Lord ....................... G06Q 10/06   |
| 9,997,078 | B2 | * | 6/2018  | Gadgil .................. G08G 5/0078     |
| 10,002,333 | B2 | * | 6/2018  | Lord ....................... G06Q 10/06  |
| 10,118,696 | B1 | * | 11/2018 | Hoffberg ............... B64C 39/001     |
| 10,176,723 | B2 | * | 1/2019  | Gadgil ................. G08G 5/0078     |

(Continued)

FOREIGN PATENT DOCUMENTS

| DE | 102006037900 A1 | 2/2008 |
| EP |       2738090 A2 | 6/2014 |
| WO | WO-2018081802 A1 | 5/2018 |

OTHER PUBLICATIONS

Pearson et al., Active control of helicopter vibration, 1994, IEEE, p. 277-284 (Year: 1994).*

(Continued)

*Primary Examiner* — McDieunel Marc
(74) *Attorney, Agent, or Firm* — Winstead PC (57) ABSTRACT

The aircraft includes a rotor. The rotor includes a plurality of rotor blades. The aircraft further includes a non-rotating aircraft component. A proximity sensor is disposed with at least one of the non-rotating aircraft component and the rotor blades. A flight control computer is electrically coupled to the proximity sensor.

20 Claims, 9 Drawing Sheets

(56) References Cited

U.S. PATENT DOCUMENTS

| | | | | |
|---|---|---|---|---|
| 10,293,928 B2* | 5/2019 | Vetter | ............... | B64C 27/30 |
| 2010/0047067 A1 | 2/2010 | Houser et al. | | |
| 2010/0252690 A1* | 10/2010 | Hothi | ............... | B64C 39/024 |
| | | | | 244/7 B |
| 2016/0288922 A1* | 10/2016 | He | ............... | B64D 45/08 |
| 2016/0305406 A1 | 10/2016 | Zell | | |
| 2016/0347446 A1* | 12/2016 | Vetter | ............... | B64C 27/30 |
| 2017/0210463 A1 | 7/2017 | Koessick et al. | | |
| 2017/0235018 A1* | 8/2017 | Foster | ............... | B64C 39/024 |
| | | | | 702/5 |
| 2018/0050795 A1 | 2/2018 | Geiger et al. | | |
| 2018/0075762 A1* | 3/2018 | Gadgil | ............... | G08G 5/0078 |
| 2019/0127056 A1* | 5/2019 | Weekes | ............... | B64C 27/08 |

OTHER PUBLICATIONS

Bae et al., Development of small flying robot with rotary wing and autonomous control system, 2008, IEEE, p. 1815-1820 (Year: 2008).*

Balke, V-22 mechanical diagnostic design approach, 1991, IEEE, p. 21-27 (Year: 1991).*

Pizetta et al., A hardware-in-loop platform for rotary-wing unmanned aerial vehicles, 2014, IEEE, p. 1146-1157 (Year: 2014).*

Cravener, Kyle Thomas, "U.S. Appl. No. 16/401,332", filed May 2, 2019.

* cited by examiner

METHOD AND APPARATUS FOR PROXIMITY CONTROL BETWEEN ROTATING AND NON-ROTATING AIRCRAFT COMPONENTS

TECHNICAL FIELD

The present disclosure relates generally to rotor-driven aircraft and more particularly, but not by way of limitation, to measurement and control systems in rotor-driven aircraft for measuring and controlling distance between rotor blades and non-rotating aircraft components.

BACKGROUND

This section provides background information to facilitate a better understanding of the various aspects of the disclosure. It should be understood that the statements in this section of this document are to be read in this light, and not as admissions of prior art.

Tilt-rotor and rotor-wing aircraft include an airframe and at least one rotor assembly having a plurality of rotor blades. During operation, it is common for the rotor assembly to experience coning or flapping, which causes displacement of the rotor blades relative to non-rotating components of the aircraft. Such displacement can bring the rotor blades within a minimum safe distance of the non-rotating components of the aircraft. Previously, rotor-blade-clearance has been addressed by extending the rotor assembly further away from the non-rotating components of the aircraft. However, this approach introduces additional weight to the aircraft and can have an undesirable impact on aerodynamics of the aircraft.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

Various aspects of the disclosure relate to an aircraft. The aircraft includes a rotor. The rotor includes a plurality of rotor blades. The aircraft further includes a non-rotating aircraft component. A proximity sensor is disposed with at least one of the non-rotating aircraft component and the rotor blades. A flight control computer is electrically coupled to the proximity sensor.

Various aspects of the disclosure relate to a flight control system. The flight control system includes a pilot control. A flight control computer is electrically coupled to the pilot control. At least one of an actuator and a servo motor are electrically coupled to the flight control computer. The at least one of the actuator and the servo motor are operable to control a flight parameter. A proximity sensor is disposed with at least one of a non-rotating aircraft component and a tip region of a rotor blade. The proximity sensor is electrically coupled to the flight control computer. The flight control computer is operable to signal the actuator to alter the flight parameter in response to the rotor blade being within a minimum safe distance of the non-rotating aircraft component.

Various aspects of the disclosure relate to a method of controlling rotor-blade clearance. The method includes measuring, via a proximity sensor, a position of a rotor blade relative to a non-rotating aircraft component. A measured position of the rotor blade is transmitted to a flight control computer. It is determined, via the flight control computer, if the rotor blade is outside of a minimum safe distance of the non-rotating aircraft component. Responsive to a determination that the rotor blade is within a minimum safe distance of the non-rotating aircraft component, a corrective action is initiated via the flight control computer.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1:
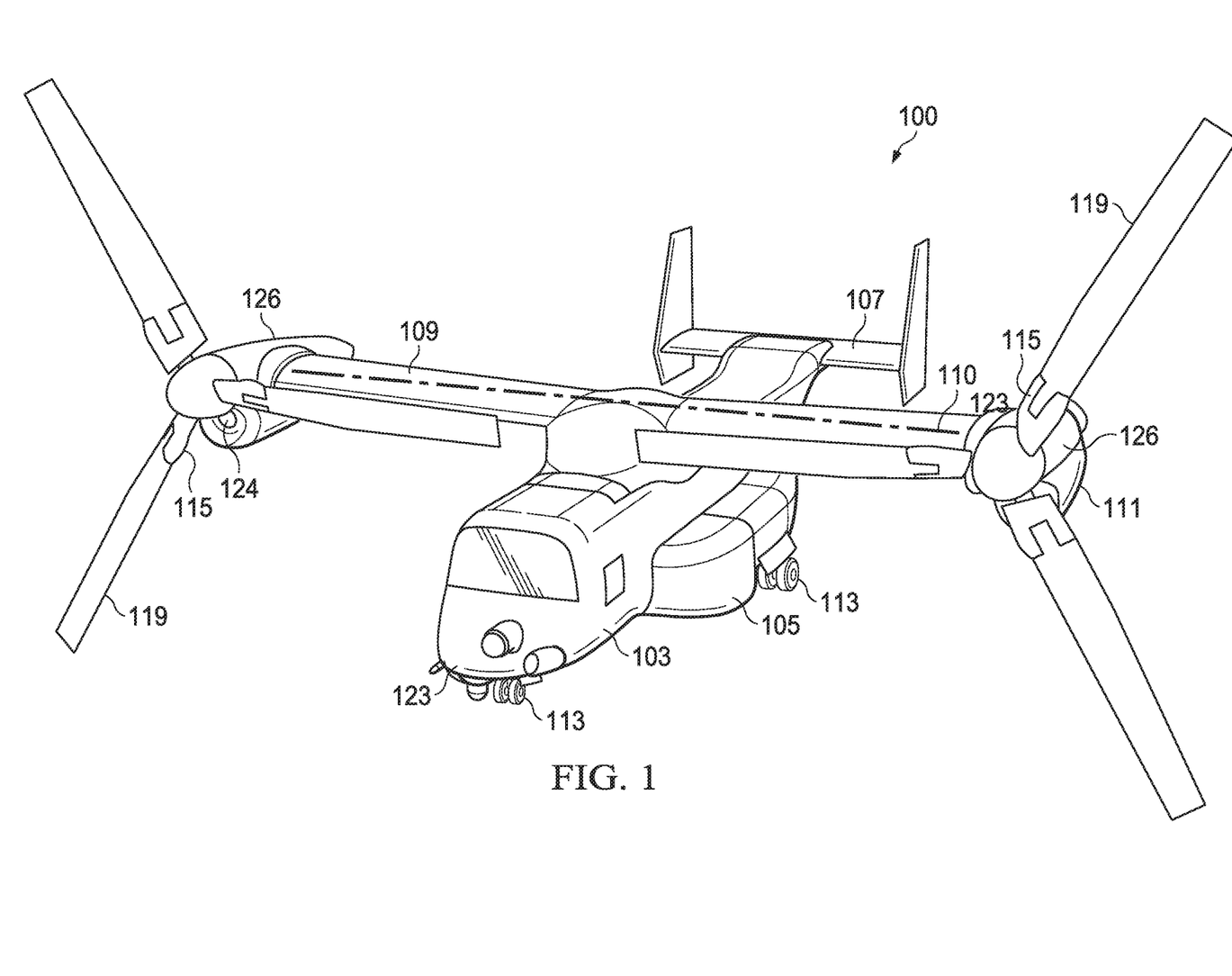
FIG. 1 is a perspective view of a tilt-rotor aircraft in airplane mode according to aspects of the disclosure.

FIG. 1 is a perspective view of a tilt-rotor aircraft 100 in airplane mode. The tilt-rotor aircraft 100 includes a fuselage 103, a sponson 105, a tail member 107, a wing 109, a propulsion system 111, and a landing gear 113. The fuselage 103 represents the body of the tilt-rotor aircraft 100. The wing 109 is coupled to the propulsion system 111 such that the propulsion system 111 provides at least one of lift and thrust to the tilt-rotor aircraft 100. By way of example in FIG. 1, the wing 109 is illustrated as a single-wing assembly; however, in other embodiments, the wing 109 could include a dual-wing assembly. Although the disclosure refers to use in conjunction with the tilt-rotor aircraft 100, a person of skill in the art will recognize that certain aspects of the disclosure could be utilized in connection with any type of aircraft to include rotor-wing and fixed-wing aircraft.

The propulsion system 111 includes an engine 124 housed within a nacelle 126. The propulsion system 111 includes a pivotable rotor 115 operatively connected to the engine 124.

In various embodiments, the rotor 115 may be, for example, a helicopter rotor, a propeller, or a proprotor of the type used, for example, in tilt-rotor aircraft. In various embodiments, the engine 124 and the nacelle 126 pivot about a long axis 110 of the wing 109 so as to orient the rotor 115 between an airplane mode (also commonly referred to as "cruise mode") and a helicopter mode (also commonly referred to a vertical take-off and landing ("VTOL") mode). The rotor 115 has a plurality of rotor blades 119 associated therewith. A position of the rotor 115, as well as a pitch of the rotor blades 119, can be selectively controlled via, for example, cyclic or collective controls by a pilot to determine heading, thrust, and lift of the tilt-rotor aircraft 100. By way of example, FIG. 1 illustrates the tilt-rotor aircraft 100 in the airplane mode, in which the rotor 115 is arranged in a substantially forward-facing orientation to impart a forward thrust to the tilt-rotor aircraft 100. A lifting force is supplied by the wing 109. When in the helicopter mode, the rotor 115 is positioned in a substantially vertical orientation so as to impart a lifting thrust to the tilt-rotor aircraft 100. In various embodiments, the tilt-rotor aircraft 100 can be operated such that the rotor 115 is selectively positioned between the airplane mode and the helicopter mode, which is referred to as a conversion mode.

Figure 2:
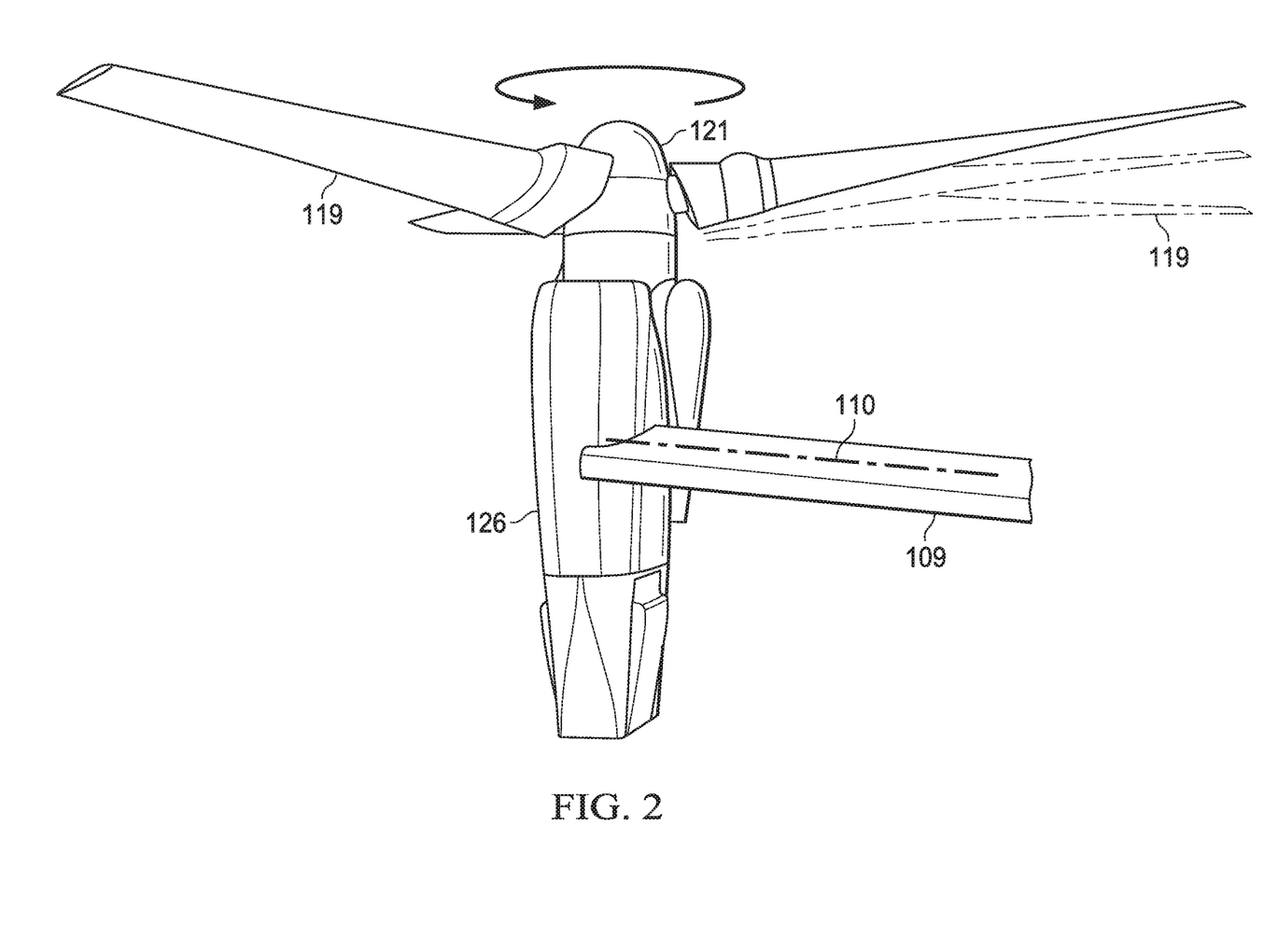
FIG. 2 is an enlarged perspective view of a nacelle and wing structure of a tilt-rotor aircraft in helicopter mode according to aspects of the disclosure.

FIG. 2 is an enlarged perspective view of the nacelle 126 and the wing 109 of the tilt-rotor aircraft 100 in the helicopter mode. For purposes of discussion, FIG. 2 is described herein relative to FIG. 1. In the helicopter mode, the nacelle 126 rotates about the long axis 110 of the wing 109 to a vertically-aligned position such that the rotor blades 119 rotate in a plane that is generally parallel to a plane of the wing 109. During operation in at least one of the airplane mode and the helicopter mode, asymmetric aerodynamic forces acting on the rotor blades 119 cause the rotor blades 119 to deflect. In various embodiments, deflections of the rotor blades 119 may be the result of, for example, "coning" or "flapping." "Coning" refers to a tendency of the rotor blades 119 to assume a conical path instead of remaining in a plane that is generally perpendicular to a mast. "Flapping" refers to an upward or downward movement of the rotor blades 119 that eliminates dissymmetry of lift. For example, in forward flight, the rotor blades 119 experience greater lift forces as they rotate forward towards the nose 123 of the tilt-rotor aircraft 100. The increased lift causes the tips of the rotor blades 119 to displace upwardly over the nose 123 of the tilt-rotor aircraft 100 and to displace downwardly over the tail member 107 of the tilt-rotor aircraft 100. Such displacement of the rotor blades 119 relative to the fuselage 103, the wing 109, and other non-rotating components of the tilt-rotor aircraft 100 can cause the rotor blades 119 to come within a minimum safe distance of non-rotating components of the tilt-rotor aircraft 100.

Figure 3:
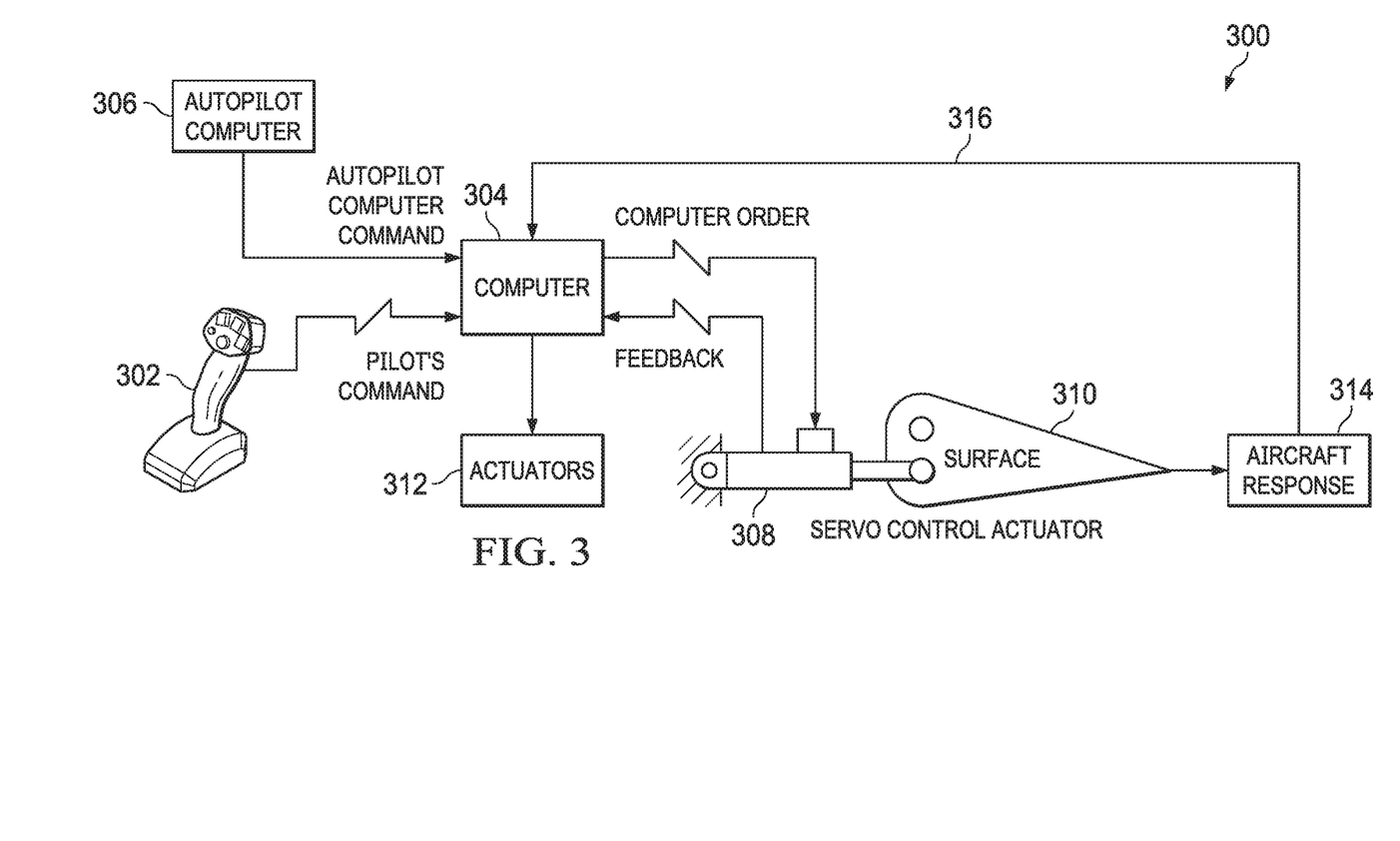
FIG. 3 is a block diagram of a flight control system according to aspects of the disclosure.

FIG. 3 is a block diagram of a flight control system 300 associated with the tilt-rotor aircraft 100. For purposes of discussion, FIG. 3 is described herein relative to FIGS. 1-2. Pilot controls 302 provide flight commands to a flight control computer 304. In various embodiments, the flight control system 300 may include multiple redundant flight control computers 304. In various embodiments, the flight commands may include, for example, airspeed, pitch, roll, yaw, rate of climb, heading, and rotor position. In some embodiments, an autopilot system 306 may also provide flight commands to the flight control computer 304. The flight control computer 304 interprets the flight commands and signals servo motors 308 which actuate control surfaces 310 such as, for example ailerons, flaps, elevators, and rudder. In other embodiments, the servo motors 308 may also control, for example, a position of the landing gear 113. The flight control computer 304 may also signal actuators 312, which control an angular position of the nacelles 126 as well as an angle of attack of the rotor blades responsive to, for example, collective or cyclic commands received from either the pilot controls 302 or the autopilot system 306. In various embodiments, the actuators 312 could be, for example, electric motors and may in various embodiments be, for example, swashplate actuators, nacelle-position actuators, throttle actuators, landing-gear actuators, or any other type of actuator for controlling a flight parameter.

Still referring to FIG. 3, the flight control computer 304 measures a response 314 of the tilt-rotor aircraft 100. In various embodiments, the flight control computer 304 measures the aircraft response 314 by measuring flight parameter such as, for example, actual rate of climb, actual airspeed, actual heading, and other flight parameters. The flight control computer 304 receives feedback 316 related to actual performance of the tilt-rotor aircraft 100. In various embodiments, the flight control computer 304 may adjust at least one of the control surfaces 310 or the position of the rotors 115 to minimize differences between a commanded performance of the tilt-rotor aircraft 100 and an actual performance of the tilt-rotor aircraft 100. In various embodiments, the flight control computer 304 may adjust at least one flight parameter to mitigate an unsafe condition.

Figure 4:
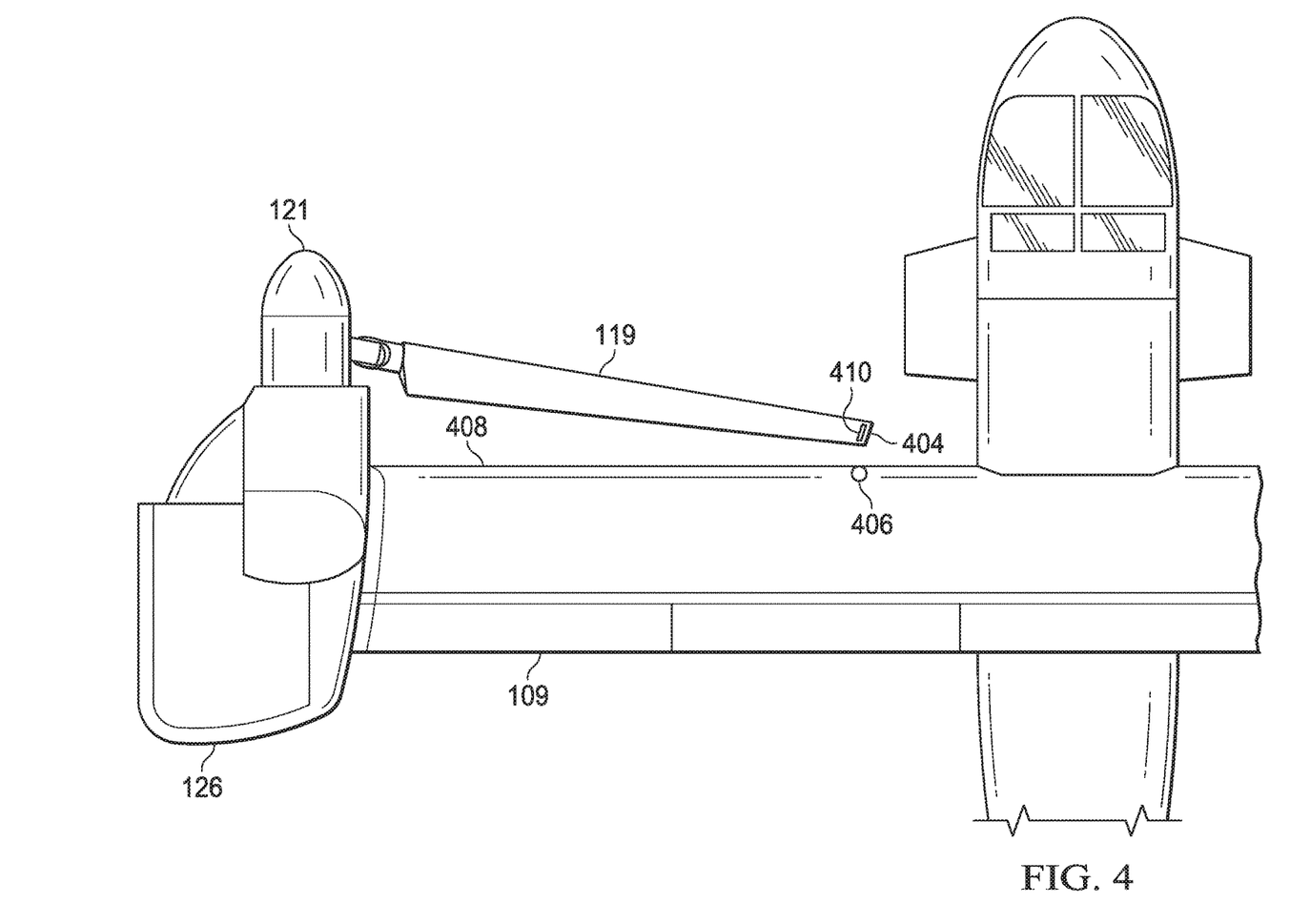
FIG. 4 is a partial top view of a wing of a tilt-rotor aircraft showing the nacelle in the airplane mode according to aspects of the disclosure.

FIG. 4 is a partial top view of the wing 109 of the tilt-rotor aircraft 100 showing the nacelle 126 in the airplane mode. For purposes of discussion, FIG. 4 is described herein relative to FIGS. 1-3. When operating in the airplane mode, certain flight maneuvers can introduce asymmetric forces to the rotor blades 119 causing the rotor hub 121 to experience flap similar to operation in the helicopter mode. When operating in the airplane mode, rotor flap can bring the rotor blades 119 into proximity of non-rotating aircraft components such as, for example, a sponson 105, the fuselage 103, the wing 109, or a wing extension 702.

Still referring to FIG. 4, a proximity sensor 406 is embedded into at least one of a tip region 404 of the rotor blades 119 and the non-rotating aircraft component. By way of example, in FIG. 4, the proximity sensor 406 is embedded in a leading edge 408 of the wing 109. An antenna 410 is embedded in the tip region 404 of the rotor blades 119. In various embodiments, the proximity sensor 406 is an electromagnetic sensor or an inductive sensor. In other embodiments, the proximity sensor could be, for example, a radar sensor or a LiDAR sensor. During operation, the proximity sensor 406 excites the antenna and detects reflections from the antenna 410. Such a process allows the proximity sensor 406 to measure a distance between the proximity sensor 406 and the antenna 410. In embodiments, where the proximity sensor 406 is, for example a radar sensor or a LiDAR sensor, the proximity sensor 406 emits a signal such as, for example, a radio wave or a light wave and measures reflections from the tip region of the rotor blades 119. In such embodiments, the proximity sensor 406 may be disposed in the leading edge 408 of the wing 109 or in the leading or trailing edge of the tip region 404 of the rotor blades 119. In such embodiments utilizing a radar or LiDAR proximity sensor 406, the antenna 410 may be omitted. The proximity sensor 406 is operatively coupled to the flight control computer 304. The proximity sensor 406 transmits a measured distance between the rotor blade 119 and the non-rotating component of the tilt-rotor aircraft 100 to the flight control computer 304. As will be discussed in more detail below, the proximity sensor 406 may, in various embodiments, be utilized to measure a distance between the rotor blades 119 and any non-rotating component of the tilt-rotor aircraft 100.

Figure 5:
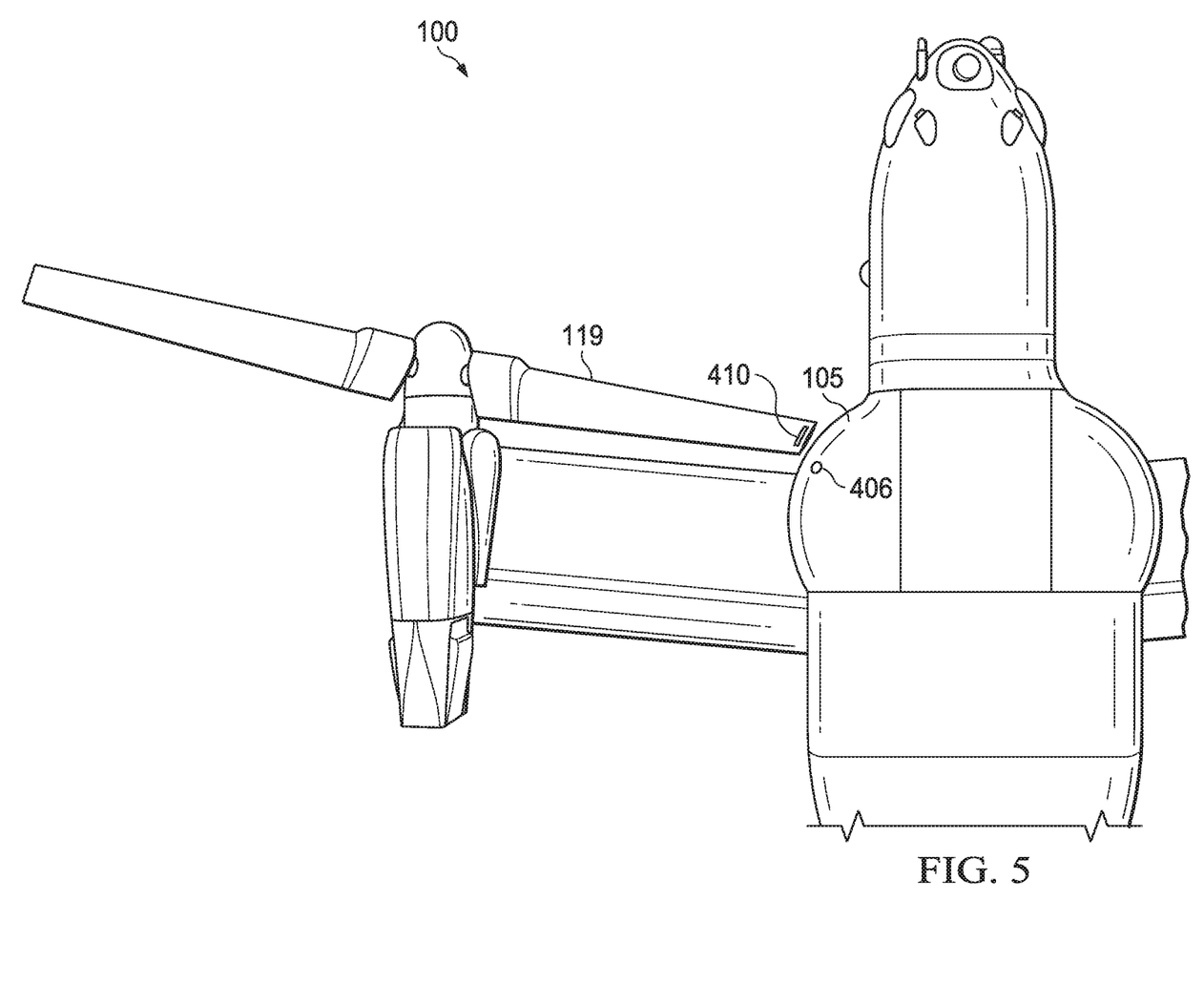
FIG. 5 is a partial bottom view of a tilt-rotor aircraft in airplane mode illustrating clearance between a rotor blade and a sponson according to aspects of the disclosure.

FIG. 5 is a partial bottom view of the tilt-rotor aircraft 100 operating in the airplane mode and illustrating a clearance between the rotor blades 119 and a sponson 105. For purposes of discussion, FIG. 5 is described herein relative to FIGS. 1-4. The proximity sensor 406 is embedded in an exterior surface of the sponson 105 and the antenna 410 is embedded in the tip region 404 of the rotor blades 119. In embodiments, where the proximity sensor 406 is, for example a radar sensor or a LiDAR sensor, proximity sensor 406 may be disposed in the sponson 105 or in the leading or trailing edge of the tip region 404 of the rotor blades 119. In such embodiments utilizing a radar or LiDAR proximity sensor 406, the antenna 410 may be omitted. The proximity sensor 406 transmits a measured distance between the rotor blade 119 and the sponson 105 to the flight control computer 304.

Figure 6:
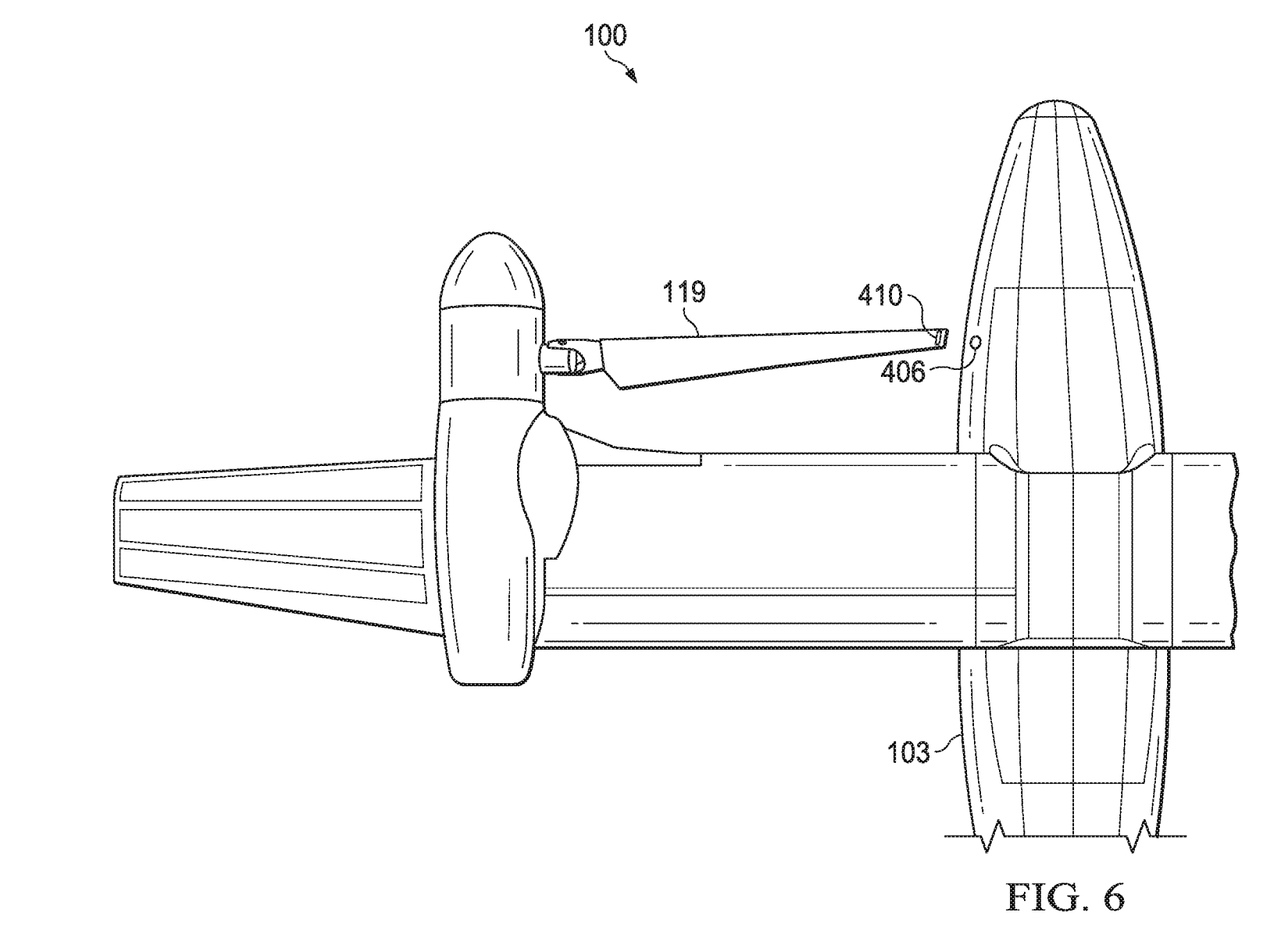
FIG. 6 is a partial top view of a tilt-rotor aircraft in airplane mode illustrating clearance between a rotor blade and a fuselage according to aspects of the disclosure.

FIG. 6 is a partial top view of the tilt-rotor aircraft 100 operating in the airplane mode illustrating clearance between the rotor blades 119 and the fuselage 103. For purposes of discussion, FIG. 6 is described herein relative to FIGS. 1-4. The proximity sensor 406 is embedded in an exterior surface of the fuselage 103 and the antenna 410 is embedded in the tip region 404 of the rotor blades 119. In embodiments, where the proximity sensor 406 is, for example a radar sensor or a LiDAR sensor, proximity sensor 406 may be disposed in the fuselage 103 or in the leading or trailing edge of the tip region 404 of the rotor blades 119. In such embodiments utilizing a radar or LiDAR proximity sensor 406, the antenna 410 may be omitted. The proximity sensor 406 transmits a measured distance between the rotor blade 119 and the fuselage 103 to the flight control computer 304.

Figure 7:
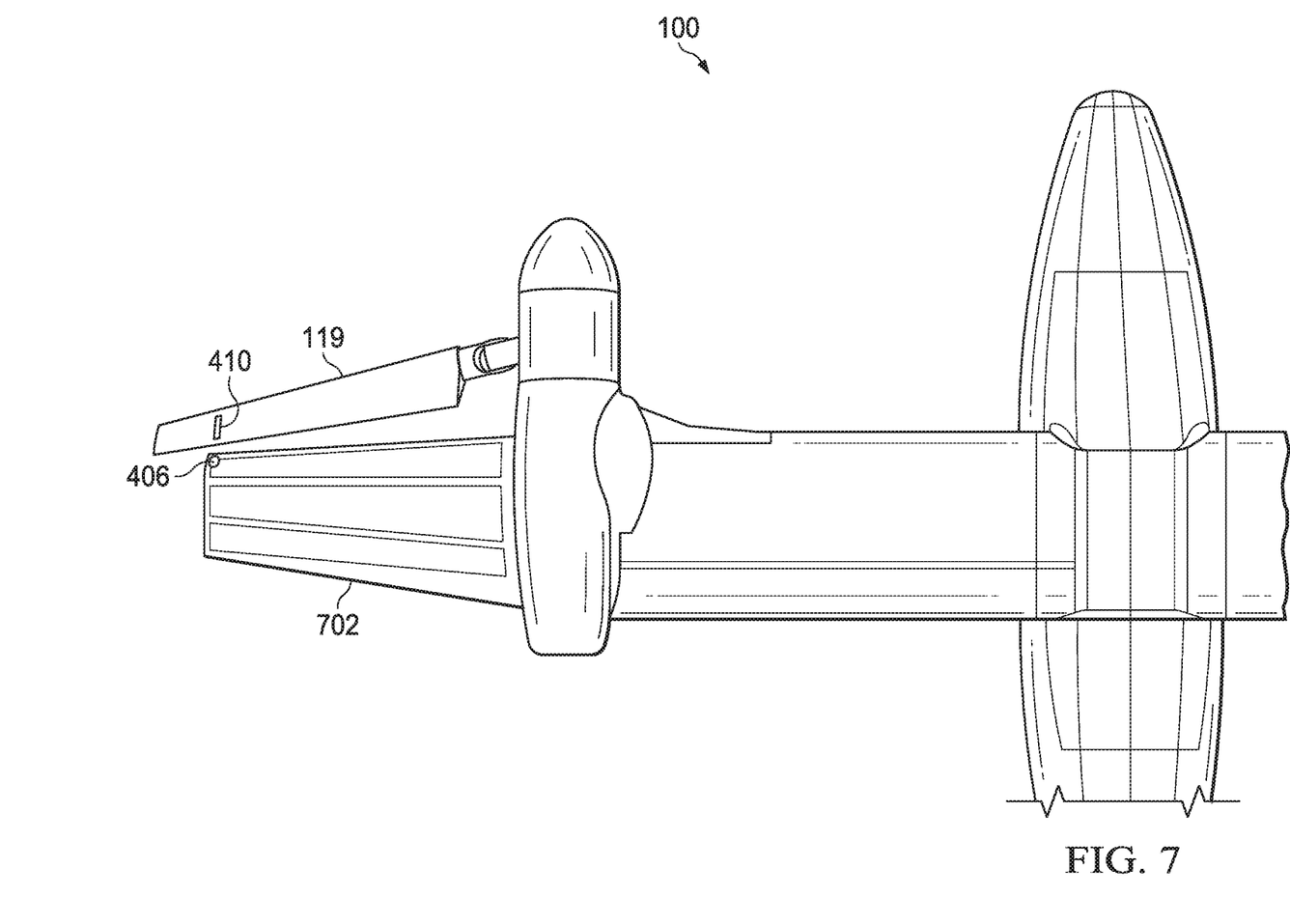
FIG. 7 is a partial top perspective view of a tilt-rotor aircraft in airplane mode illustrating clearance between a rotor blade and a wing extension according to aspects of the disclosure.

FIG. 7 is a partial top perspective view of the tilt-rotor aircraft 100 in airplane mode illustrating clearance between the rotor blades 119 and a wing extension 702. For purposes of discussion, FIG. 7 is described herein relative to FIGS. 1-4. In various embodiments, a wing extension 702 may extend laterally from the nacelle 126. The proximity sensor 406 is embedded in a leading edge of the wing extension 702 and the antenna 410 is embedded in the tip region 404 of the rotor blades 119. In various embodiments utilizing a radar or LiDAR proximity sensor 406, the proximity sensor 406 may be disposed in the wing extension 702 or the trailing edge or the leading edge of the tip region 404 of the rotor blades 119. In such embodiments utilizing a radar or LiDAR proximity sensor 406, the antenna 410 may be omitted. The proximity sensor 406 transmits a measured distance between the rotor blade 119 and the wing extension 702 to the flight control computer 304.

Figure 8:
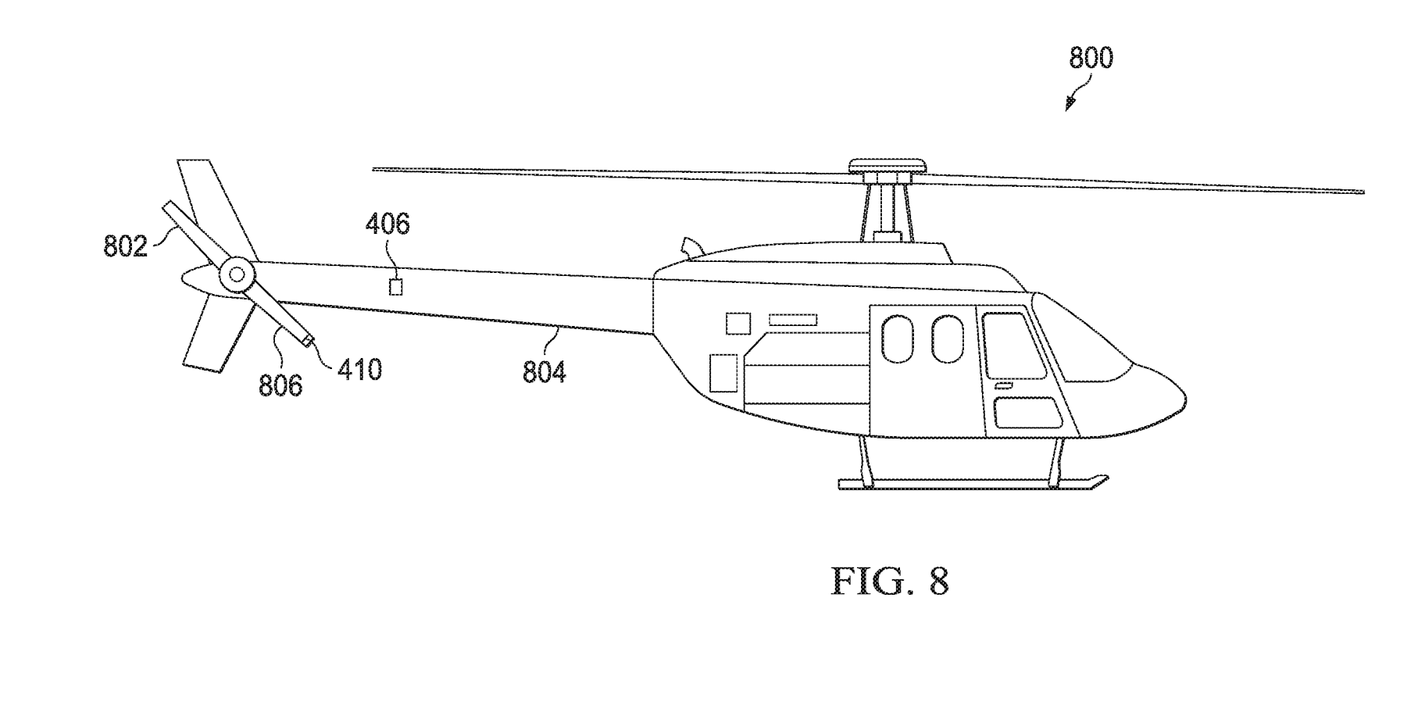
FIG. 8 is a perspective view of a rotor-wing aircraft illustrating clearance between a tail rotor and a tail boom according to aspects of the disclosure.

FIG. 8 is a partial perspective view of a rotor-wing aircraft 800 illustrating clearance between a tail rotor 802 and a tail boom 804. For purposes of discussion, FIG. 8 is described herein relative to FIG. 4. Although the proximity sensor 406 and the antenna 410 have been described herein as being used in conjunction with the tilt-rotor aircraft 100, one skilled in the art will recognize that the proximity sensor 406 could be utilized to measure a distance between rotating aircraft components and non-rotating aircraft components of any type of aircraft including, for example, rotor-wing aircraft, fixed-wing aircraft, and tilt-rotor aircraft. In the case of the rotor-wing aircraft 800, the proximity sensor 406, in various embodiments, may be embedded in an exterior surface of the tail boom 804 and the antenna 410 may be embedded in a tip region 806 of the tail rotor 802. In embodiments, where the proximity sensor 406 is, for example a radar sensor or a LiDAR sensor, proximity sensor 406 may be disposed in the tail boom 804 or in the leading or trailing edge of the tip region 806 of the tail rotor 802. In such embodiments utilizing a radar or LiDAR proximity sensor 406, the antenna 410 may be omitted. The proximity sensor 406 transmits a measured distance between the tail rotor 802 and the tail boom 804 to the flight control computer 304.

Still referring to FIG. 8, a clearance between a main rotor 808 and a fuselage 810 is also illustrated. The proximity sensor 406, in various embodiments, may be embedded in an exterior surface of the fuselage 810 and the antenna 410 may be embedded in a tip region 812 of the main rotor 808. In embodiments, where the proximity sensor 406 is, for example a radar sensor or a LiDAR sensor, proximity sensor 406 may be disposed in the fuselage 810 or in the leading or trailing edge of the tip region 812 of the main rotor 808. In such embodiments utilizing a radar or LiDAR proximity sensor 406, the antenna 410 may be omitted. The proximity sensor 406 transmits a measured distance between the main rotor 808 and the fuselage 810 to the flight control computer 304.

Figure 9:
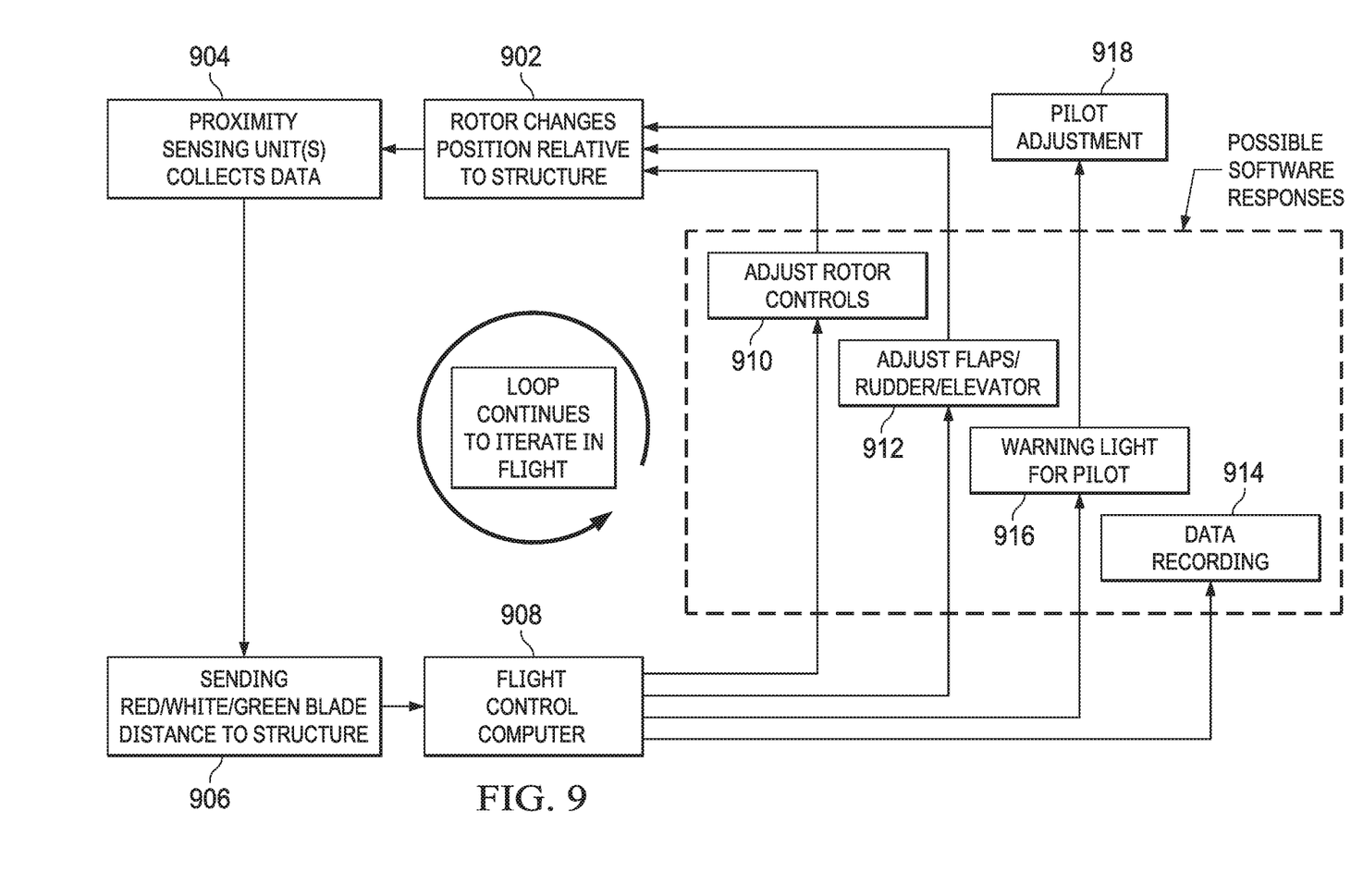
FIG. 9 is a flow diagram of a method for controlling distance between aircraft components.

FIG. 9 is a flow diagram of a method 900 for controlling distance between aircraft components. For purposes of discussion, FIG. 9 is described herein relative to FIGS. 1-4. At block 902, the rotor blades 119 change position relative to non-rotating components of the tilt-rotor aircraft 100. At block 904, the proximity sensor 406 collects data about a position of the rotor blades 119 relative to the non-rotating components of the tilt-rotor aircraft 100. At block 906, a distance of each rotor blade 119 from the non-rotating aircraft component is transmitted to a flight control computer 304 At block 908, if the distance between the rotor blade 119 and the non-rotating aircraft component is less than a defined minimum safe distance, the flight control computer 304 initiates one or more corrective actions. By way of example, the corrective actions may include adjustment of rotor controls (shown in block 910), adjustment of flight control surfaces such as, for example, flaps, rudder, and elevators (shown in block 912), data recording (shown in block 914), and providing a warning indication to the pilot (shown in block 916). In various embodiments, the warning indication could be, for example, a warning light or an audible alarm. In embodiments, where a warning indication is provided to the pilot, at block 918, the pilot adjusts the controls of the tilt-rotor aircraft 100 in an effort to take corrective action.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms, methods, or processes). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. An aircraft comprising:
   a rotor having a plurality of rotor blades;
   a non-rotating aircraft component;
   a proximity sensor configured to detect a proximity of a rotor blade of the plurality of rotor blades to the non-rotating aircraft component and disposed within at least one of the non-rotating aircraft component and the plurality of rotor blades; and
   a flight control computer electrically coupled to the proximity sensor.

2. The aircraft of claim 1, wherein the non-rotating aircraft component is a wing.

3. The aircraft of claim 1, wherein the non-rotating aircraft component is a sponson.

4. The aircraft of claim 1, wherein the non-rotating aircraft component is a fuselage.

5. The aircraft of claim 1, wherein the non-rotating aircraft component is a wing extension.

6. The aircraft of claim 1, wherein the non-rotating aircraft component is a tail boom.

7. The aircraft of claim 1, wherein the proximity sensor is at least one of an electromagnetic sensor, an inductive sensor, a radar sensor, and a LiDAR sensor.

8. The aircraft of claim 1, comprising an antenna embedded in a tip region of each rotor blade of the plurality of rotor blades.

9. The aircraft of claim 1, comprising at least one of an actuator and a servo motor electrically coupled to the flight control computer.

10. The aircraft of claim 9, wherein:
    the flight control computer is operable to signal the at least one of the actuator and the servo motor to adjust a flight parameter responsive to a determination that the plurality of rotor blades are within a minimum safe distance of the non-rotating aircraft component; and
    wherein the flight parameter includes at least one of, a nacelle position, a rotor-blade position, a control surface position, and a landing gear position.

11. A flight control system comprising:
    a pilot control;
    a flight control computer electrically coupled to the pilot control;
    at least one of an actuator and a servo motor electrically coupled to the flight control computer, the at least one of the actuator and the servo motor operable to control a flight parameter;
    a proximity sensor configured to detect a proximity of a rotor blade to a non-rotating aircraft component and disposed within at least one of the non-rotating aircraft component and a tip region of the rotor blade, the proximity sensor being electrically coupled to the flight control computer; and
    wherein, the flight control computer is operable to signal the actuator to alter the flight parameter in response to the rotor blade being within a minimum safe distance of the non-rotating aircraft component.

12. The flight control system of claim 11, comprising an antenna embedded in at least one of a tip region of a rotor blade and the non-rotating aircraft component.

13. The flight control system of claim 11, wherein the at least one of the actuator and the servo motor control at least one of a nacelle position, a rotor position, a control surface position, and a landing gear position.

14. The flight control system of claim 11, wherein the pilot control includes at least one of cyclic and collective control.

15. The flight control system of claim 11, wherein the flight parameter includes at least one of a heading, an airspeed, and a rate of climb.

16. A method of controlling rotor-blade clearance, the method comprising:
    measuring, via a proximity sensor disposed within at least one of a non-rotating aircraft component and a rotor blade, a proximity of the rotor blade relative to the non-rotating aircraft component;
    transmitting a measured position of the rotor blade to a flight control computer;
    determining, via the flight control computer, if the rotor blade is outside of a minimum safe distance of the non-rotating aircraft component; and
    responsive to a determination that the rotor blade is within a minimum safe distance of the non-rotating aircraft component, initiating, via the flight control computer a corrective action.

17. The method of claim 16, wherein the corrective action comprises providing at least one of an audible or visual warning to a pilot.

18. The method of claim 16, wherein the corrective action comprises at least one of adjusting a rotor position and adjusting a control surface position.

19. The method of claim 16, comprising recording, via the flight control computer, position information of the rotor blade.

20. The method of claim 16, wherein the non-rotating aircraft component is selected from the group consisting of a wing, a fuselage, a sponson, and a tail boom.

* * * * *